Figure 4:
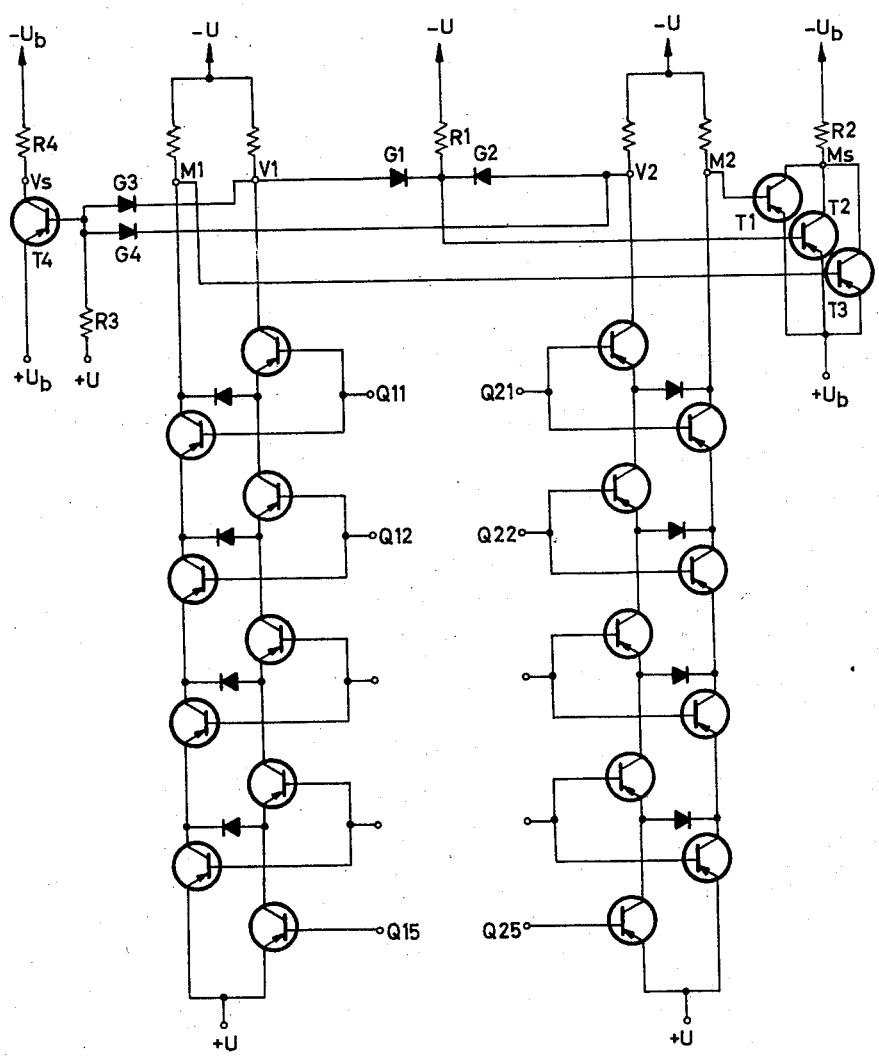

Sept. 1, 1959 D. VOEGTLEN 2,902,642
TESTING ELECTRICAL CIRCUITS FOR AMBIGUITY AND COMPLETENESS
Filed March 11, 1958 2 Sheets-Sheet 1
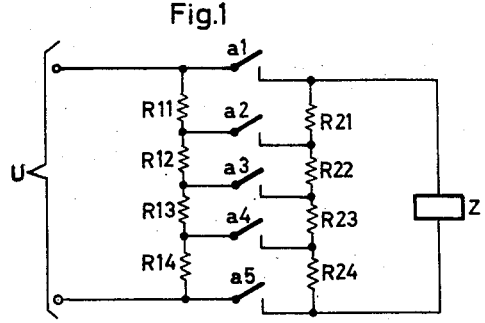
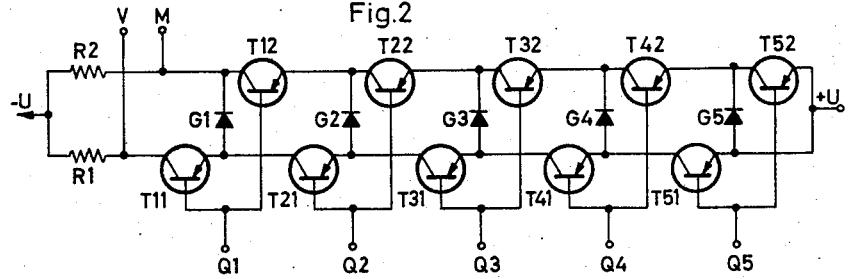
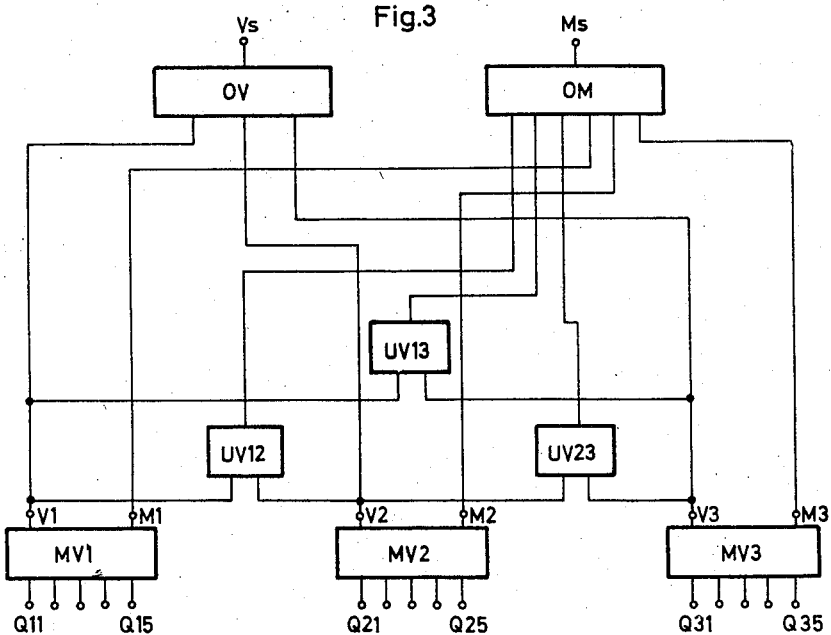

United States Patent Office 2,902,642
Patented Sept. 1, 1959

2,902,642

TESTING ELECTRICAL CIRCUITS FOR AMBIGUITY AND COMPLETENESS

Dieter Voegtlen, Munich, Germany, assignor to Siemens and Halske Aktiengesellschaft, Berlin and Munich, Germany, a corporation of Germany Application March 11, 1958, Serial No. 720,657

Claims priority, application Germany March 22, 1957

6 Claims. (Cl. 324—51)

This invention is concerned with a circuit arrangement for testing electrical circuits for ambiguity and completeness.

Certain equipment in signalling systems, for example, telephone systems contains a great number of relays or corresponding switching elements, the proper functioning of such equipment requiring at any one time operative actuation of only one of such relay or switching element. Accordingly, only one of the control potential sources must at any time deliver working potential. There may be provided, in such equipment, a plurality of groups of relays which must meet this operational requirement. Similarly, there may be in a system a plurality of equipment units. Equipment or units of equipment of this type may be, for example, markers.

The proper operation of such groups of relays may be supervised by respectively ascertaining by means of testing apparatus whether there are simultaneously more than one relay in operated position or whether there is more than one working potential supplied by the corresponding potential sources. If such is the case, a signal will be actuated. The corresponding testing apparatus is termed an ambiguity tester.

Such an ambiguity tester, for sufficiently reliable operation, must fulfill diverse requirements, for example, it should be relatively insensitive to trouble; the relays to be supervised should not require any or only few auxiliary contacts serving the purposes of supervision; no particular requirements should be posed so far as tolerances are concerned, etc. Finally, the expenditure in switching means should be relatively low.

Some ambiguity testers provide for the supervision contact pyramids formed of contacts controlled by the relays to be supervised. The drawback of such arrangement is, in the case of a relatively great number of relays to be supervised, that many contacts are connected in series, thus favoring trouble due to addition or summation of contact transition resistances. In addition, each relay to be supervised must have several auxiliary contacts.

Other types of ambiguity testers employ relays which receive at times current insufficient to effect operative actuation thereof, thus requiring particular tolerance conditions for the operatively effective currents, which is to be considered a drawback.

The invention provides improved circuit ambiguity and circuit completeness testing apparatus avoiding the shortcomings and drawbacks of prior devices of this kind. The various objects and features of the invention will appear in the course of the description of embodiments which will be rendered below with reference to the accompanying drawings. In the drawings, Fig. 1 shows a special circuit to explain the manner in which trouble can occur in a circuit ambiguity tester;

Fig. 2 illustrates a circuit ambiguity tester according to the invention;

Fig. 3 indicates the manner of connecting together three testing circuits in accordance with a rule of the invention; and Fig. 4 shows the manner of interconnecting two testing circuits constructed in accordance with Fig. 2.

In Fig. 1, the potential difference occurring between two contacts controlled by relays to be supervised, is evaluated for the purpose of actuating a signalling device Z. The circuit is assumed to be provided for supervising five relays. Each of the relays controls the operation of a make contact, the corresponding contacts $a1$ to $a5$ being connected between tabs of two series circuits each containing four similar resistors R11 to R14 and R21 to R24, respectively. The series of resistors R11 to R14 is supplied with current from a direct current source with the voltage U while the indicating or signal relay Z is connected to the series circuit of resistors R21 to R24.

Assuming now that one make contact $a1$ to $a5$ is closed, no current will flow by way of the signal relay Z, because its two terminals will be on the same voltage. However, in case two of the make contacts should be closed, for example, contacts $a1$ and $a2$, there will be the voltage U on one terminal of the relay Z, by way of contact $a1$, and at the other terminal, there will be a lower voltage by way of contact $a2$ and the resistors R24, R23, R22. Due to the voltage difference on its terminals, relay Z will receive current and will energize. The operatively effective voltage difference is in this case smaller than $\frac{1}{4}$ of the total voltage U due to the subdivision of the total voltage at the series circuit of the resistors. If contacts $a1$ and $a5$ should be closed, relay Z will receive voltage reduced as compared with the total voltage. In the supervision of five relays, the voltage at the indicating means will, accordingly, vary approximately from the value of about $\frac{1}{4}$ U to U, that is, more than four-fold. More than two contacts may, of course, be closed by the relays to be supervised. The voltage at the indicating or signalling relay will then be determined mainly by the contacts disposed farthest apart.

This circuit has several drawbacks. Current flows over the resistors R11 to R14 even in normal condition of the circuit, constituting a loss current, which is of the same order of magnitude as the operating current. In addition, the voltage at the signalling relay fluctuates considerably, which is a great disadvantage. Only a limited number of relays or potential sources can be supervised with this circuit arrangement.

The invention provides a circuit which avoids the shortcomings of the above described circuit, employing an arrangement requiring small expenditure so far as switching elements are concerned. The switching elements used are electronic switching elements providing for ambiguity indication and also for circuit completeness indication. Completeness testing means, in this connection, testing to ascertain whether there actually is a relay or a corresponding or equivalent switching element in operated position or whether at least one of the supervised potential sources delivers working potential.

The circuit arrangement according to the invention provides two series circuits each comprising as many transistors connected to the operating voltage, as there are potential sources, the first transistor in each series having a collector resistance and the emitters of the transistors of one series circuit being connected with the collectors of the corresponding transistors in the other series circuit by way of rectifiers which are adapted to pass the emitter-collector voltage, each potential source being connected to the base electrodes of two cooperating transistors, making such transistors normally conductive while blocking them by the operating potential. Provided that at least one potential source delivers working potential, a completeness indicating potential differing from the normal condition will appear at the connecting point between collector and neighboring transistor of one of the series circuits, and if at least two potential sources deliver working potential, an ambiguity indicating potential will appear at the connecting point between collector resistor and neighboring transistor of the other series circuit.

Fig. 2 shows an embodiment of such a circuit, providing for five potential sources Q1 to Q5. The working potential is in such case to be more positive than the normal potential of the potential sources; the sources may have ground potential in the normal condition thereof. There are, accordingly p-n-p transistors employed which are placed in blocking condition responsive to increase of the potential at the base electrodes. In accordance with the rule for constructing the unit, the two series circuits, comprise transistors T11 to T51 and resistor R1 and transistors T12 to T52 and resistor R2, respectively. Both series circuits are connected with the operating voltage source by way of terminals —U and +U. Between tabs of the series circuits there are disposed rectifiers G1 to G5. The base electrodes of each two of the transistors of the two series circuits are interconnected and respectively connected to the potential sources Q1 to Q5. Between the resistor R1 and the transistor T11 of one of the series circuits is connected a terminal V which is to deliver a completeness indicating potential. Between the resistor R2 and the transistor T12 is connected the terminal M which is to deliver the ambiguity potential.

If there is no working potential delivered by any of the sources Q1 to Q5, that is, if all sources are at normal potential, all transistors will be conductive because the potentials on the base electrodes will be lower than the potentials at the emitters. Accordingly, at terminals V and M there will appear nearly the voltage on the terminal +U indicative of the normal condition of the circuit, so that there is neither a condition of circuit completeness nor a condition of circuit ambiguity. In case working potential should be on one of the sources, for example, on the source Q2, such working potential having positive polarity and making the base electrodes of the transistors T21 and T22 more positive than the emitters, the transistors T21 and T22 will be blocked against current flow therethrough. However, there is between the emitter of the transistor T21 and the collector of transistor T22 the rectifier G2 which is due to the voltage between these two electrodes open for passing current, and current can, therefore, flow from the terminal +U by way of transistors T51, T41, T31, rectifier G2 and transistor T12, to the terminal —U. No current can flow through the other rectifiers. Accordingly, due to the blocking of transistors T21 and T22, no current will flow over resistor R1 and the potential at the terminal —U will appear at the terminal V, acting as the completeness indicating potential. The potential at terminal M is, however, not altered on account of continued current flow through the resistor R2. Due to the symmetry of the circuit, there would appear the same potentials at the terminals V and M in the presence of working potential at a potential source other than the source Q2.

The case to be considered next is one in which working potential appears additionally at a second potential source. In such case, two transistors will be blocked in each series circuit. The two additionally blocked transistors may lie on one or the other side of the series circuit with respect to the previously blocked transistors. It shall be assumed that these are again the transistors T21 and T22. Accordingly, one of the additionally blocked transistors will block either the current path over the transistors T51, T41, T31 or over the transistor T12; no current can in such case flow over the series circuit, and the potential on the terminal —U will appear on the terminal M in addition to appearing on the terminal V, acting at the terminal M as an ambiguity potential. Due to the symmetry of the circuit, this would also take place if any two of the other sources would have operating potential. Likewise, blocking of more than two transistors in each series circuit would not effect further alteration of the potentials at the terminals V and M.

It will be apparent, therefore, that the circuit according to the invention will in each case signal circuit ambiguity and circuit completeness. A particular advantage of the circuit resides in the fact that amplification will be effective, due to the use of the transistors, between the inputs Q1 to Q5 and the outputs V and M.

It will be observed also that blocking of the transistor T52 does not effect the remaining circuit since the transistor is in such case bridged by the rectifier G5 which is connected in pass direction. The transistor T52 may, therefore, be replaced by a shunt and the rectifier G5 may in such case be also omitted. Both these elements have been included in the circuit so as to bring out the construction thereof. An analogous circuit may also be constructed by using n-p-n transistors. However, in such case, the working potential of the potential sources would have to be more negative than the normal potential thereof. Other switching elements adapted to operate as switches may be used in place of transistors in corresponding manner.

A given number of potential sources, especially when many such sources are present, are preferably subdivided in groups, each group containing the same number of sources, which are mutually tested for ambiguity and completeness as will be explained with reference to Fig. 2. Particular switching operations must in such case be carried out in order to recognize ambiguity even when potential sources with working potential are in different groups and in order to obtain a completeness indication with reference to the entire potential sources. This testing procedure may, of course, also be used in the initial presence of several groups of potential sources which are to be supervised or tested in their totality. In order to recognize in such arrangement ambiguity with respect to all potential sources, the connecting points delivering the completeness indication potential are connected in pairs, in all different combinations, to the inputs of "And" circuits the outputs of which jointly with the connecting points delivering the ambiguity indicating potentials being connected to the inputs of an "Or" circuit which delivers in the presence of ambiguity at its output ambiguity indicating potential, over all potential sources of the plurally arranged circuit. In addition, the connecting points delivering the completeness indicating potential are, for the completeness indication connected to the inputs of an "Or" circuit adapted to deliver completeness potential in the presence of an operating potential at least at one of the potential sources to be tested.

Fig. 3 shows as an example the manner of interconnecting three test circuits according to the above explained rule. There are three test circuits MV1, MV2 and MV3, each having terminals for five potential sources respectively indicated at Q11–Q15, Q21–Q25 and Q31–Q35, which are to be supervised. The test circuit MV1 is in addition provided with a terminal V1 for delivering the completeness indicating potential, and a terminal M1 for delivering, if necessary, an ambiguity indicating potential. Corresponding terminals V2, M2 and V3, M3 are provided for the two other test circuits MV2 and MV3, respectively. For the three terminals V1, V2, V3, for the completeness indicating potential, there are three combinations arranged in pairs, in which these terminals are connected with three "And" circuits UV12, UV13, UV23. The outputs of the latter circuits are respectively connected with three inputs of the "Or" circuit OM provided with three further inputs to which are connected the terminals M1, M2, M3 delivering the ambiguity indicating potential. The "Or" circuit OM is provided with an output Ms at which will appear an ambiguity indicating potential when there is ambiguity with respect to all potential sources for, in case there are two potential sources with operating potential at one and the same test circuit such as MV1, MV2, MV3, the test circuit affected will deliver the indicating potential by way of the "Or" circuit and hence to the terminal Ms, and in case two potential sources are with working potential at the terminals of different test circuits, such potential will at the respectively associated terminals deliver completeness indicating potential, activating both inputs of the corresponding "And" circuit which transmits the ambiguity potential by way of its output connected with the "Or" circuit, causing in such case again appearance of ambiguity potential at terminal Ms. In case only one of all the potential sources in all groups has working potential, one of the terminals V1, V2 or V3 will deliver completeness indicating potential. Since these terminals V1, V2, V3 are connected to the "Or" circuit OV, such potential will appear at the terminal Vs.

The above described interconnection of the test circuits may, of course, be modified or altered upon using test circuits which are constructed differently. The principal requirement for the realization of the purpose in view resides merely in the presence of terminals for delivering the corresponding completeness and ambiguity indicating potentials, respectively.

Fig. 4 illustrates the interconnection of two testing circuits constructed in accordance with the requirements of Fig. 2 and showing in addition examples of embodiments for the required "And" and "Or" circuits. Since there are only two testing circuits, only one "And" circuit is required, as compared with three such circuits shown in Fig. 3. Each of the two testing circuits has again five connections for potential sources Q11–Q15 and Q21–Q25, respectively, as well as terminals M1—V1 and M2—V2 for delivering the indicating potentials. To these terminals are connected the "Or" and the "And" circuits.

The "And" circuit comprises rectifiers G1 and G2 and a resistor R1. These elements are connected in star circuit, the terminals V1 and V2 being respectively connected with the rectifiers G1 and G2 and the resistor R1 being connected to the terminal −U. The star point forms the output of the circuit. The rectifiers are polarized so the normal potential that might be on the terminals V1 and V2, corresponding to the potential on the terminal, +U, can be propagated to the star point. However, when there is completeness indicating potential on the two terminals, corresponding to the potential at the terminal −U, such potential will also be conducted to the star point, by way of resistor R1, to mark or indicate ambiguity.

The "Or" circuit OM of Fig. 3 finds in Fig. 4 its counterpart in the circuit comprising the p-n-p transistors T1, T2, T3 and the collector resistor R2. The emitters are connected in common to the terminal +Ub, and the resistor R2 is connected at terminal −Ub to the operating voltage source for this "Or" circuit. This operating current source is such, that the p-n-p transistors are blocked over their base electrodes by the voltage of the terminal +U which is in normal condition present on the terminals M1 and M2 and also on the star point; the more negative ambiguity indicating potential making the transistors conductive. The connecting point between the resistor R2 and the collectors serves as an indicating point for the ambiguity. When no transistor is conductive, the potential at the indicating point Ms will correspond to that on the terminal −Ub; however, when one of the transistors is conductive, a considerably more positive potential will appear at Ms, corresponding to that on the terminal +Ub, thereby indicating ambiguity.

The "Or" circuit OV of Fig. 3 finds in Fig. 4 its counterpart in the "Or" circuit comprising the rectifiers G3, G4 and the resistor R3, such circuit also containing the transistor T4 and the resistor R4. The switching elements of the "Or" circuit are connected star-fashion, with the terminals V1 and V2 connected respectively to the rectifiers G3 and G4 and the terminal +U connected to the resistor R3. The star point forms the output of the "Or" circuit. The rectifiers are polarized so that a completeness indicating potential that might be on one of the terminals V1 or V2, corresponding to the potential on the terminal −U, can be propagated to the star point. If there is no completeness indicating potential on any of the terminals V1 and V2, the voltage on the terminal −U will prevail at the star point by way of resistor R1. The potential surge occurring at the star point is utilized for controlling the p-n-p transistor T4 having the collector resistor R4, thereby effecting an amplification. The completeness indicating potential is obtained at the connecting point Vs between the resistor R4 and the collector of transistor T4.

The voltage drops at the switching elements of the arrangement may be overcome by the use of transistors in the "And" and "Or" circuits.

Changes may be made within the scope and spirit of the appended claims.

I claim:

1. In a circuit system, a testing device for respectively ascertaining ambiguity and completeness of circuits established in said system by means of a plurality of potential sources, comprising two series circuits of transistors each including as many transistors as there are potential sources, means for connecting said transistors to operating current, a collector resistor for each first transistor in each series transistor circuit, means for connecting the emitters of the transistors of one series circuit with the collectors of corresponding transistors of the other series circuit by way of rectifiers adapted to pass emitter-collector voltage, means for connecting each potential source to the base electrodes of two transistors each disposed in one of said series circuits, the normal potential of said sources being operative to make said transistors conductive and positive operating potential thereof blocking respective transistors, whereby a completeness indicating potential different from normal condition is produced at a connecting point between collector resistor and said first transistor of one series circuit, in the presence of positive operating potential delivered from one of said potential sources, and whereby an ambiguity indicating potential differing from the normal condition is produced at a connecting point between collector resistor and said first transistor of the other series circuit, in the presence of positive working potential delivered from at least two of said potential sources.

2. An arrangement according to claim 1, comprising a plurality of testing devices, a plurality of connecting points for delivering completeness indicating potential, "And" and "Or" circuit means, means for connecting said connecting points in pairs in different combinations, each pair to the input of an "And" circuit means, means for connecting the outputs of said "And" circuit means and the connecting points for delivering ambiguity indicating potential to the inputs of an "Or" circuit means, said "Or" circuit means delivering ambiguity indicating potential in the presence of ambiguity at the potential sources connected to said devices.

3. An arrangement according to claim 2, wherein said "And" circuit means consists of a star circuit comprising connecting points adapted to deliver completeness indicating potential, rectifier means adapted to pass normal potential, a resistor connected with the completeness indicating potential, and means for connecting the star point of said star circuit with said "Or" circuit means.

4. An arrangement according to claim 3, wherein said "Or" circuit consists of a parallel circuit of transistors connected to operating voltage and having a common collector resistor, the base electrodes of said transistors forming the inputs of said "Or" circuit, the operating voltage of the transistors being such that said transistors are made conductive by an ambiguity indicating potential to produce at the connecting point of the collectors a potential marking ambiguity present with respect to all said potential sources.

5. An arrangement according to claim 4, comprising means for connecting the connecting points delivering completeness indication potential to the inputs of an "Or" circuit, such circuit delivering completeness indicating potential in the presence of a positive working potential appearing at one of said potential sources.

6. An arrangement according to claim 3, wherein said "Or" circuit consists of a star connection of connecting points delivering completeness indicating potential, rectifier means blocked to completeness indicating potential, and a resistor connected to normal potential, the star point of said star connection being connected to the base electrode of a transistor with an operating voltage such that said transistor becomes conductive upon appearance of a completeness indicating potential at one of said connecting points.

References Cited in the file of this patent
UNITED STATES PATENTS

| | | |
|---|---|---|
| 2,543,050 | Oberman | Feb. 27, 1951 |
| 2,846,526 | Moore et al. | Aug. 5, 1958 |